United States Patent [19]

Talley

[11] Patent Number: 6,058,493
[45] Date of Patent: *May 2, 2000

[54] LOGGING AND REPRODUCTION OF AUTOMATED TEST OPERATIONS FOR COMPUTING SYSTEMS

[75] Inventor: Stephen C. Talley, Colorado Springs, Colo.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/842,683

[22] Filed: Apr. 15, 1997

[51] Int. Cl.7 ...................................................... G06F 11/00
[52] U.S. Cl. .............................. 714/38; 714/25; 395/704; 395/712
[58] Field of Search ........................ 395/183.14, 183.01, 395/183.13, 701, 704, 708, 712; 364/267.91, 267.8, 282, 285; 714/38, 25, 37

[56] References Cited

U.S. PATENT DOCUMENTS

| 5,021,997 | 6/1991 | Archie et al. | 395/183.07 |
| 5,335,342 | 8/1994 | Pope et al. | 395/183.14 |
| 5,513,315 | 4/1996 | Tierney et al. | 395/183.13 |
| 5,671,351 | 9/1997 | Wild et al. | 395/183.14 |
| 5,742,754 | 4/1998 | Tse | 395/183.14 |
| 5,751,941 | 5/1998 | Hinds et al. | 395/183.14 |

*Primary Examiner*—Dieu-Minh T. Le
*Attorney, Agent, or Firm*—Holland & Hart LLP

[57] ABSTRACT

A system, method, and computer program product for performing an evaluation of a software product wherein a logging module stores in a storage area, such as log file, a description of each loggable test step performed by automated test software. When the automated test is complete or when the software product has filed the automated test, the logging module can write the contents of the log file to a tangible medium so that a user can determine the source of the error or manually reproduce the test steps.

10 Claims, 8 Drawing Sheets

LOGGING AND REPRODUCTION OF AUTOMATED TEST OPERATIONS FOR COMPUTING SYSTEMS

BACKGROUND OF THE INVENTION

1. Field of the Invention

This invention relates in general to automated testing of software products for computing systems. More specifically, this invention relates to manual reproduction and logging of the operations performed by an automated testing system on a software product.

2. Description of the Background

Producers of software products generally test the software products prior to release to assure its proper operation on as many different operating systems and computer hardware platforms as possible.

In testing a software product, both manual tests and automated tests are conventionally used to verify the proper operations of the software product. Manual tests are generally performed by a person exercising the various features and functions of the software product in the same manner as a user would be expected to use the product. If a large number of tests are to be performed on the software product, manual testing is generally slow and unreliable. Manual testing is therefore generally undesirable given the market and customer demands for producing adequately tested software products in reasonable amounts of time.

Automated testing is a way of testing a software product through the use of test software, operating on a computing system, which simulates actual user input and verifies the proper operations of the software product. The test software seeks to exercise every capacity of the software product as a user would if the user had unlimited time. The software product is tested using multiple variables and inputs on various computing platforms and systems within which the software product may be used. Automated tests generally run faster and are more reliable than a manual test for testing a software product.

As software products become more complex and contain a greater number of routines and features, the test software routines have become more lengthy and complex, requiring increasing amounts of time to setup and perform.

Typically, to develop an automated test for a particular software product, a software test designer develops detailed knowledge of the software product by studying the product specifications, extracting a list of features of the software product, and generating a number of operational expectations which the product should satisfy under certain operating conditions. The test designer then develops a set of "test cases," in the form of test software routines, which exercise the code blocks in the software product to verify its proper operation. The test designer may create hundreds or even thousands of test cases for a single complex software product. A collection of test cases for a software product is known as a test suite.

It will be appreciated that it may require days or weeks to test fully a software product by exercising each code block and each code path within the product on all possible combinations of computer models and operating systems on which the product was designed to be run. As software products become even more complex, the amount of testing time may become even larger, thereby increasing the production costs of the software product.

Despite the benefits of automated testing of software products, conventional automated testing utilities do not generally provide sufficient information to assist a person, other than the test designer, to determine the source of the error when a software product fails an automated test. A simple error message is generally insufficient to fully appreciate the nature and possible cause of the error without detailed knowledge of the actual test steps performed by automated test software. However, only the test designer would generally know enough about the test performed to understand the nature of the product failure since, as previously mentioned, these tests can take days to perform. Interpreting the actual testing software code to trace the possible source of the software product failure can also take substantial amounts of time, particularly if the test designer is unavailable to assist in the review of the product error.

While conventional automated test platforms provide stack traces which can indicate a variety of environmental variables, pointers, counters, and memory values when an error occurs, such information is often too cryptic and difficult to understand by a person who is not intimately familiar with the test software. When a software product fails an automated test, it would also be difficult for a person unfamiliar with the test software to manually reproduce the exact steps performed by the automated test without first having to study and understand the complex automated test software routines.

Further, when testing a new release or new version of an existing software product which itself was already successfully tested, if the new version contains only slight differences over the existing software product, it would be wasteful to write from scratch a completely new set of test cases for the new version of the product, or to run the full cycle of automated tests on the new version, because this process could take days.

What is needed is an automated testing system which provides simple textual descriptions of the test steps performed by the test software so that a person not intimately familiar with the test software can more easily determine the source of the error in the software product.

What is also needed is an automated testing system which provides a concrete list of test steps which would enable a person to manually reproduce the exact steps performed so that the point of failure of the software product can be manually verified.

What is further needed is a software testing method which would provide a specific list of test steps, performed by an automated test of an existing software product, for manual reproduction of the automated test by a person desiring to quickly test the basic functionality of a new software product release or version only which is slightly different than the existing software product.

SUMMARY OF THE INVENTION

In accordance with this invention, the above problems have been solved by a system, method, and computer program product for performing an evaluation of a software product wherein a logging module stores in a storage area, such as log file, a description of each loggable test step and any sub-process steps performed by automated test software. When the automated test is complete or when the software product has failed the automated test, the logging module can print the contents of the log file so that a user can determine the source of the error or manually reproduce the test steps.

Disclosed herein is a system for performing an evaluation of a software product. The system has a test software module, a process logging module, and a storage area. The test software module, having one or more test steps identified as loggable test steps, exercises the software product and determines a test status (pass/fail) of the software product responsive to the test software module. The process logging module, responsive to the test software module, logs a description of each of the loggable test steps to the storage area. A printing module can write to a tangible medium the description of each of the loggable test steps of the storage area, along with the test status of the software product.

If one of the loggable test steps has a sub-process with dynamic data, a sub-process logging module, responsive to the test software module, also logs a description of the sub-process and the dynamic data to the storage area.

According to a broad aspect of the invention, a method is presented for providing simple textual descriptions of the test steps performed by the automated testing software. If the software product passed the automated test, the list of the test steps performed can be later used by a person to manually test a new version or release of the software product. If the software product failed the automated test, the list of test steps performed can assist a person in understanding the nature of the software product failure. The method has an associating step which associates a textual description with a loggable test step identified from one or more test steps to be performed by a test software module. An executing step performs the loggable test step, and a writing step writes the textual description of the loggable step to a tangible medium, such as a printer, a display, or a computer readable file. The executing step can further produce a test result status indicating whether the software product passed or failed the executing step, and the writing step can further write the test result status to the tangible medium.

The above steps in another implementation of the invention are provided as an article of manufacture, i.e., a computer storage medium containing a computer program of instructions for performing the above-described steps. Specifically, a computer program product has two computer readable code devices. The first computer readable code device causes a computer to effect an exercise of the software product and determine a test status of the software product, the computer readable code devices having one or more test steps identified as loggable test steps. The second computer readable code device causes a computer to effect a logging of a description of each of the loggable test steps to a storage area. An additional computer readable program code device can be configured to cause a computer to effect a printer to print the description of each of the loggable test steps of the storage area, or a display to display the description of each of the loggable test steps stored in the storage area.

In another embodiment of the invention, a method is disclosed for converting an automated test of a first software product to a manual test of a second software product, where the second software product is derived from the first software product. The first software product is tested using a test software module, having one or more test steps identified as loggable test steps, which exercises the software product and determines a test status of the first software product responsive to the test software module. A storing step places a description of each loggable test step performed on the first software product in a storage area. A writing step writes the description of each of the loggable steps to a tangible medium. The second software product is manually tested by performing each test step listed in the tangible medium.

The great utility of the present invention is that a list of the test steps performed by an automated test software module can be generated and used for evaluating a software product by a person who did not author the automated test software.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

Figure 1:
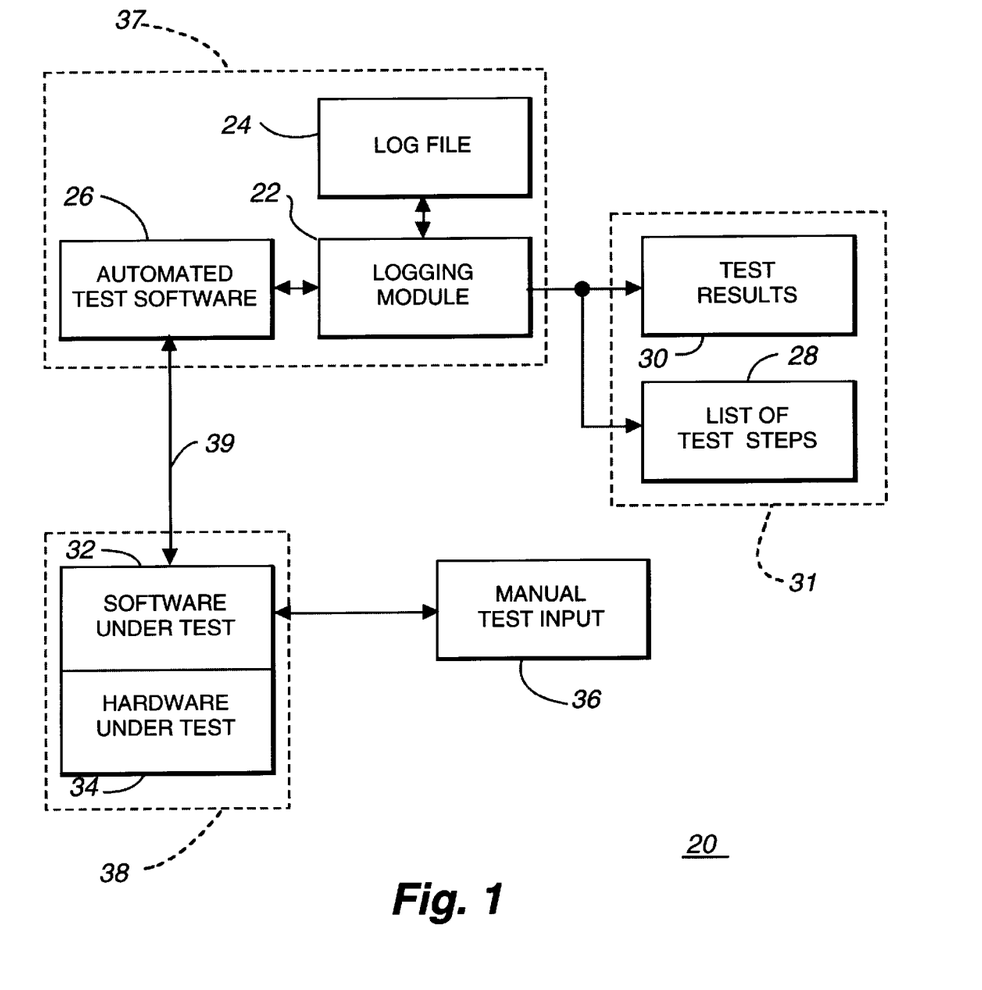
FIG. 1 illustrates a block diagram of a system of the present invention for performing the operations of the present invention.

FIG. 1 illustrates a block diagram of the present invention. Testing system 20 employs a logging module 22, a log file or storage area 24, and automated test software 26. Automated test software 26, referred to also as "test software", exercises the operations of the software product 32 under test and the hardware 34 under test. Automated test software 26 contains numerous test case routines for exercising the various functions and verifying the proper operations of software product 32, and can operate in conjunction with a test software compiler such as QA PARTNER™ (not shown).

In accordance with the present invention, when software product 32 is tested, logging module 22 stores, in log file 24, a textual description of the test steps performed by automated test software 26. The log file or storage area 24 can be any medium, persistent or volatile, for the storage of data such as a computer's general random-access memory or a file on a hard-drive.

Logging module 22 also stores a textual description of any dynamic sub-processes of a test step, and the dynamic data associated with the dynamic sub-processes. A dynamic sub-process is involved when a test step produces dynamic data which is not known a priori until the test software is actually run, and which therefore cannot be hard-coded into the automated test software.

Figure 9:
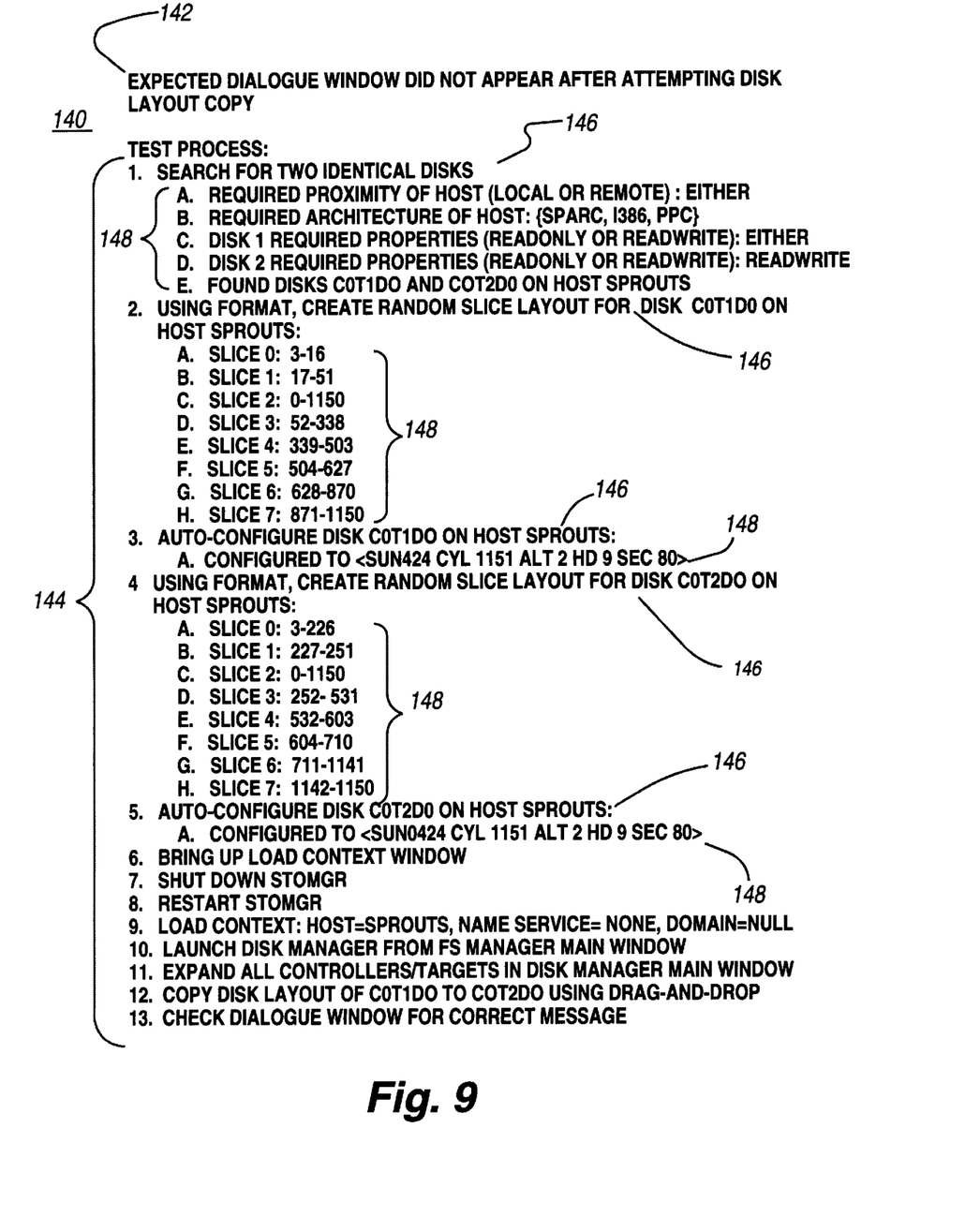
FIG. 9 illustrates an example of the output generated by the present invention showing an error message and a list of test steps performed prior to generation of the error message in accordance with the present invention.

Logging module 22 also provides as an output a list of test steps 28 which includes the textual description of the test steps, the sub-processes, and the dynamic data, along with test results 30. The list of test steps, sub-processes, dynamic data, and the test results are displayed within a tangible medium 31, such as a display screen, a computer-readable file, a printed page, or the like. An example of the output of logging module 22 is shown in FIG. 9 and will be further described below.

A person unfamiliar with the details of the automated test software 26 can review the list of steps 28 and results 30 to ascertain the nature of any failure of the software product 32, particularly where the test software 26 is extremely lengthy and complex. Logging module 22 will be described in greater detail below with reference to FIGS. 3–9.

As shown in FIG. 1, the software product 32 can also be tested through manual test input 36, which is typically a person verifying a basic set of operations of the software product 32. As previously discussed, testing of software product 32 is preferably performed through automated test software 26 due to the gains in efficiency and reliability. However, in accordance with the present invention, an automated test can be converted to a manual test if a person requests from the logging module a list of test steps 28, which includes steps, sub-processes and dynamic data, for manual verification of the operations of the software product 32. This feature of the present invention is particularly valuable where a new revision of an existing software product needs to be quickly tested, and the existing software product already successfully passed a complex set of software tests specially developed for the existing software product. The list of test steps, sub-processes, and dynamic data can guide the person through the tests and parameters to be used to quickly manually verify the basic proper operation of the new revision of the software product.

Automated test software 26, logging module 22, and log file 24 can operate within a testing computer 37. A separate computer 38 can contain the software product 32 and the hardware 34 under test. The testing computer 37 and the computer 38 can communicate over link 39, which could be a network or similar link. Alternatively, automated test software 26, logging module 22, log file 24, software product 32 could reside within a single computer as separate processes or virtual machines interacting together.

The hardware 34 under test could include several pieces of hardware such as different computing machines, I/O devices, network interfaces, etc., depending on the computing platform within which the software product 32 is being tested.

It will also be understood that logging module 22 could be integrated within the automated test software 26. Alternatively, logging module 22 could be part of a callable shared library existing as an independent entity available to and responsive to automated test software 26.

Figure 2:
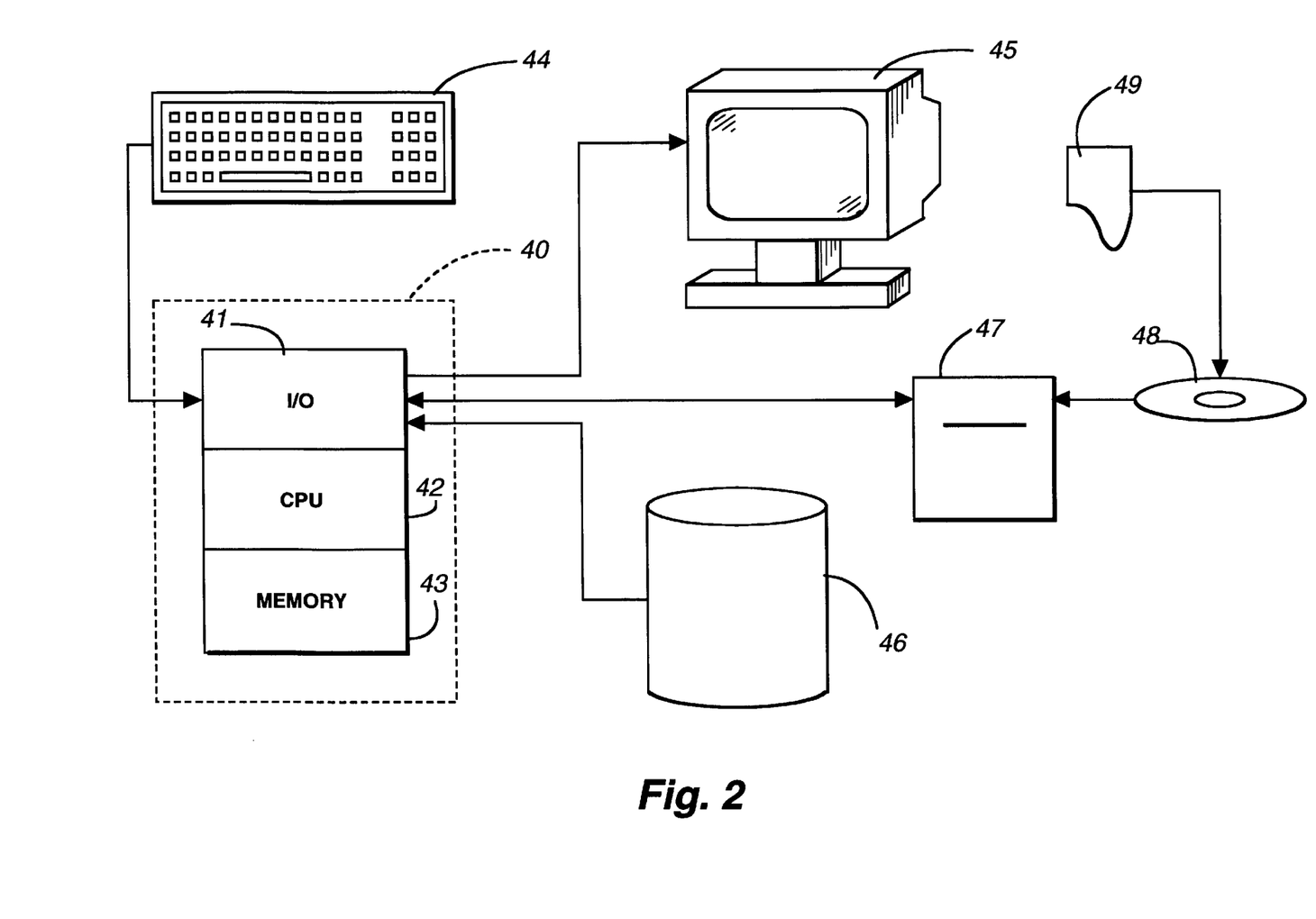
FIG. 2 illustrates a block diagram of a computer system, which may be part of a network computer system, showing one environment in which the present invention may be employed.

The operating environment in which the present invention is used encompasses a standalone computing system as well as a general distributed computing system. In the distributed computing system, general purpose computers, workstations, or personal computers are connected via communication links of various types in a client-server arrangement. Programs and data, many in the form of objects, are made available by various members of the system. Some of the elements of a standalone computer or a general purpose workstation are shown in FIG. 2, wherein a processor 40 is shown, having an input/output (I/O) section 41, a central processing unit (CPU) 42 and a memory section 43. The I/O section 41 is connected to a keyboard 44, a display unit 45, a disk storage unit 46, and a CD-ROM drive unit 47. The CD-ROM unit 47 can read a CD-ROM medium 48 which typically contains programs 49 and data. The computer program products containing mechanisms to effectuate the apparatus and methods of the present invention may reside in the memory section 43, on the disk storage unit 46, or on the CD-ROM 48 of such a system. Examples of such systems include SPARC Systems offered by Sun Microsystems, Inc., personal computers offered by IBM Corporation and by other manufacturers of IBM compatible personal computers, and systems running the UNIX operating system or Solaris™ operating system.

Preferably the invention can be embodied in a computer program product for testing other computer program products. It will be understood that the computer program product of the present invention preferably is created in a computer usable medium, having computer readable code embodied therein for causing a computer program product to be generated. The computer usable medium preferably contains a number of computer readable program code devices configured to cause a computer to affect the various functions required to carry out the invention, as herein described.

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

Figure 3:
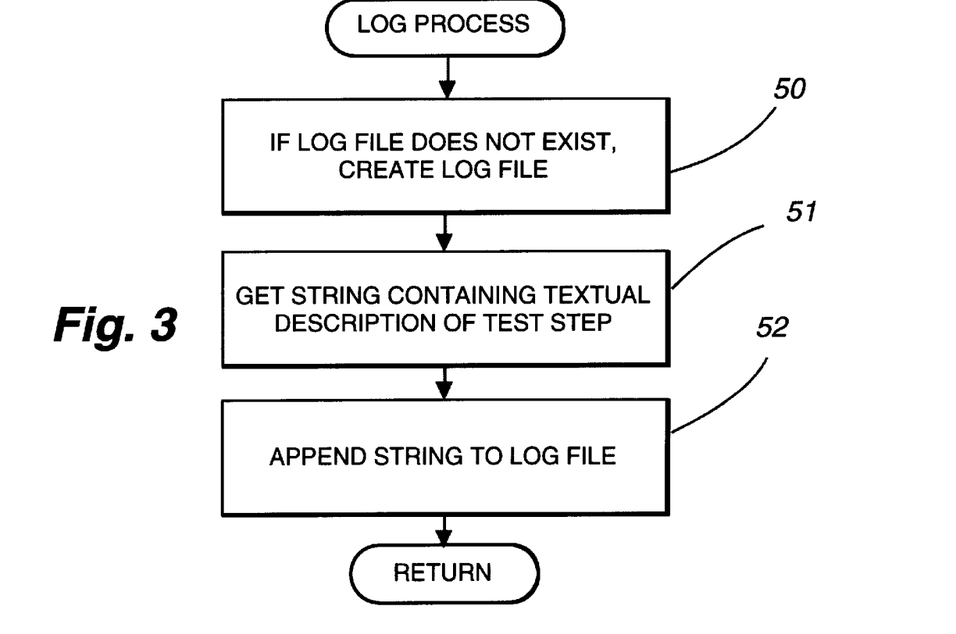
FIG. 3 illustrates the logical operations of the log process module of the present invention.
Figure 4:
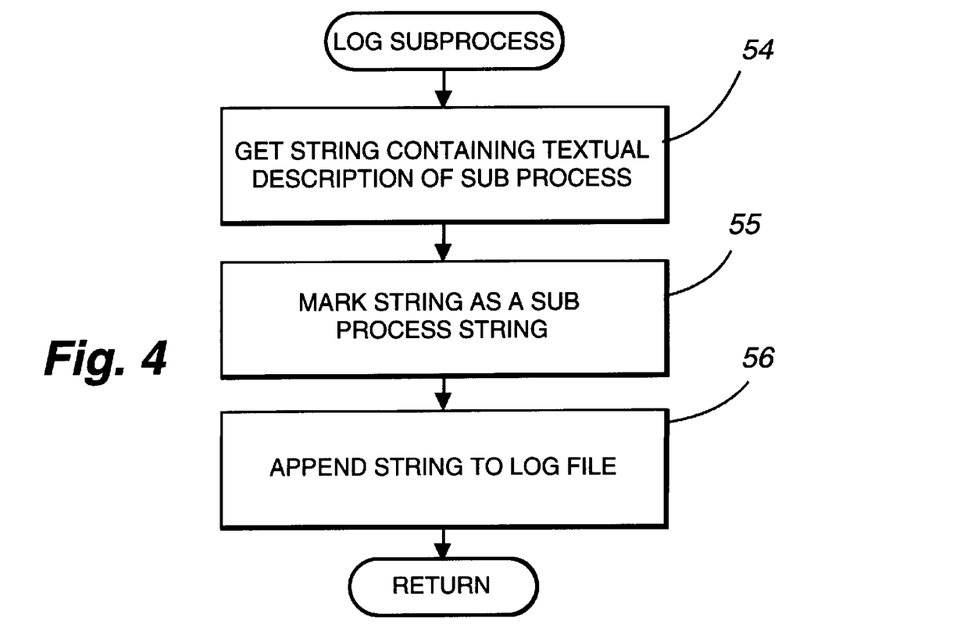
FIG. 4 illustrates the logical operations of the log sub-process module of the present invention.
Figure 5:
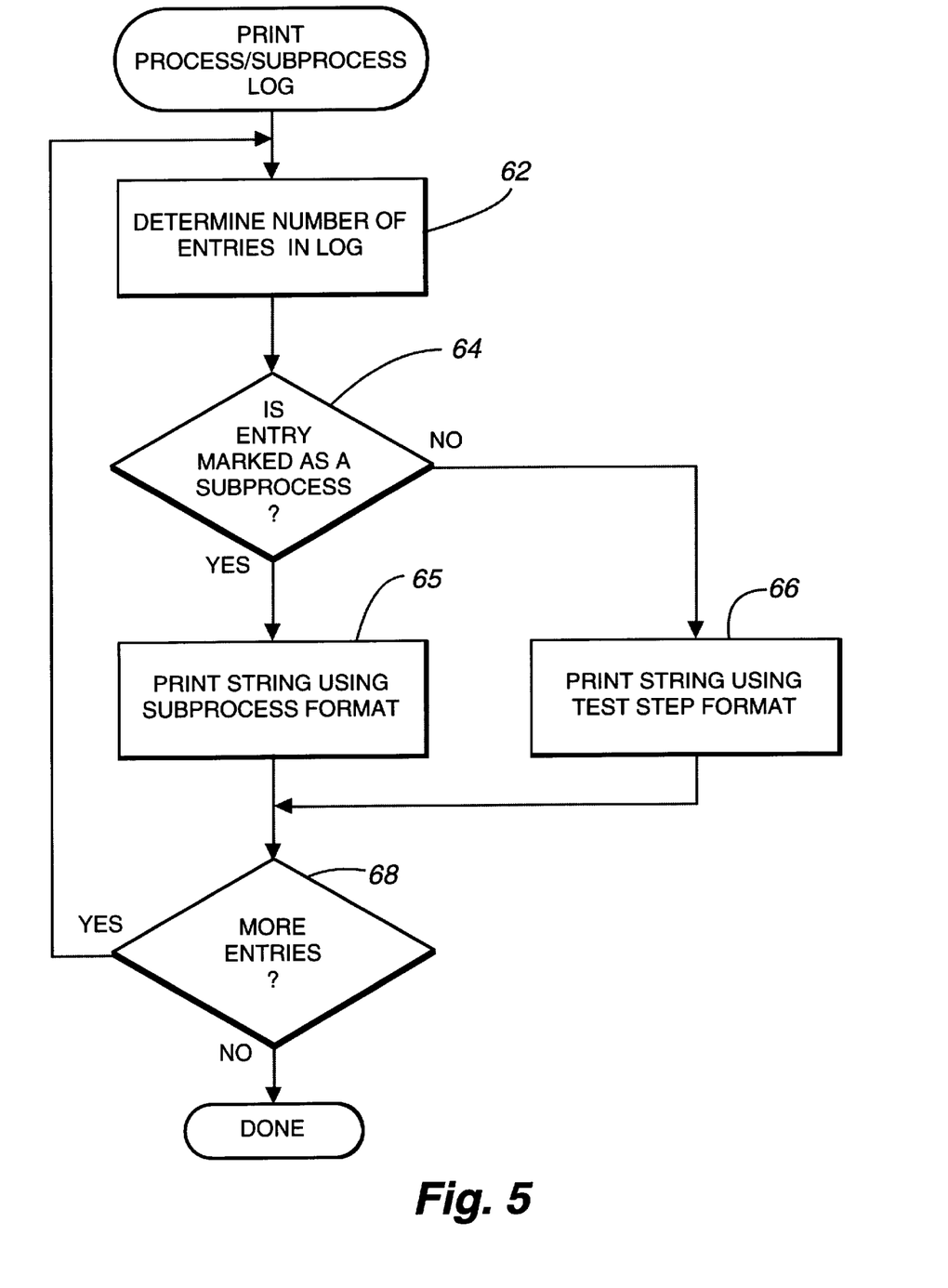
FIG. 5 illustrates the logical operations of the module of the present invention to print the contents of the process/sub-process log.

In one embodiment of the present invention, the test software 26 (FIG. 1) contains a call to the logging module 22 at each loggable test step contained with the test software. The call from the test software to the logging module passes a textual string variable which contains the description of the test steps to be performed so that the logging module will place in the log file the description of the test step, sub-process, or dynamic data. A single description of a test step may correspond to multiple lines of operations within the test software. The logging module has a log string module, a log sub-process module, and a print module. FIGS. 3, 4, and 5 show embodiments of these modules of the present invention.

FIG. 3 illustrates the logical operations for logging a test step to a log file. File operation 50 determines if a log file exists or storage area has been allocated for storage of the test process information, and creates a log file or allocates a storage area if none already exist. Fetching operation 51 obtains the string containing a textual description of the test step. Operation 51 can be realized when a string variable is passed from the test software to the logging module for processing therein. Storage operation 52 stores or appends the string to the log file for storage therein. Control is then returned to the calling program (i.e., the test software).

FIG. 4 illustrates the logical operations for logging a sub-process and dynamic data to a log file. Fetching operation 54 obtains the string containing a textual description of the sub-process and the dynamic data associated therewith. Operation 54 can be realized when a string variable is passed from the test software to the logging module for processing therein. Encoding operation 55 marks the string as a sub-process string so that it can be differentiated from a test process string in the log file. Storage operation 56 stores or appends the marked sub-process string to the log file for storage therein. Control is then returned to the calling program (i.e., the test software).

While both operation 52 (FIG. 3) and operation 56 (FIG. 4) have been described as appending the string to the log file, the actual manner or order in which the string is stored in the log file, or the particular storage medium chosen, is an inconsequential matter of choice depending on the particular implementation chosen.

FIG. 5 illustrates the logical operations for printing or writing the contents of the log file to a tangible output medium. Counting operation 62 determines the number of entries present in the log file. Decoding operation 64 determines if the present entry is marked as a sub-process string. If so, then printing operation 65 writes the sub-process string and dynamic data associated therewith to the tangible output medium using a format for sub-processes. This format should be different than the format for test step strings so that a user can easily distinguish between the test steps and the sub-processes as displayed in the tangible medium. If decoding operation 64 determined that the present entry in the log file is not a sub-process string, then printing operation 66 writes the test step string to the tangible output medium using a format for test steps. Operation 68 passed control to operation 62 if there are more string entries in the log file for processing.

While the operations of FIG. 5 have been described as "print" operations, it is understood that these operations could include writing the strings in their appropriate formats to any tangible medium, such as a display device, a computer readable file, a printed page, or otherwise.

Figure 6:
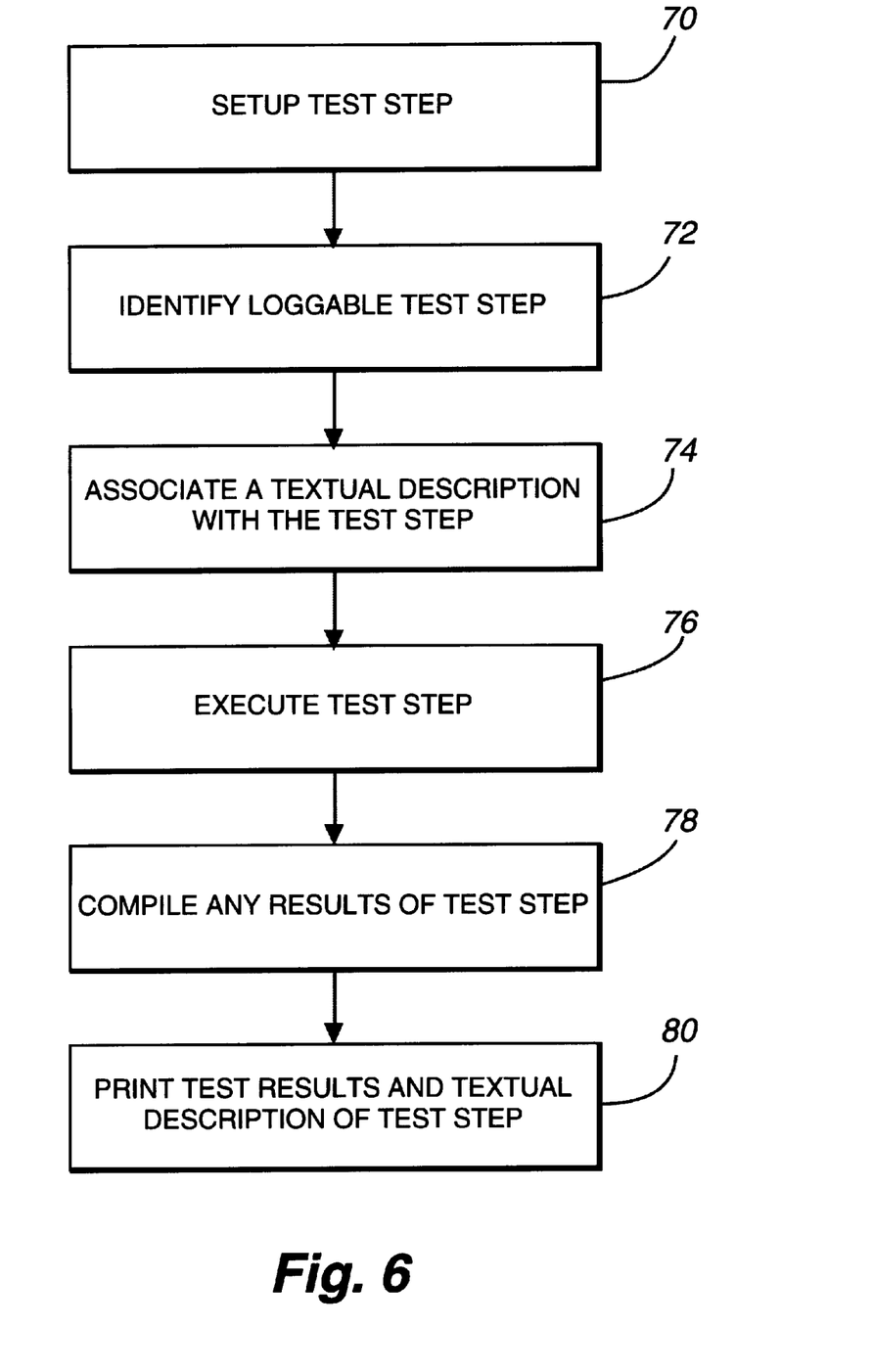
FIG. 6 illustrates another embodiment of the logical operations of the present invention.

With reference to FIG. 6, the logical operations of another embodiment of the present invention are shown for testing a software product. Operation 70 sets up the test steps of the automated test software. In this regard, the test steps would include a variety of operations written in a test case for exercising a particular function or set of functions of the software product.

Operation 72 identifies a loggable test step of the automated test software for logging in the log file. A test step is loggable if the test step of the test software is necessary to be known by others if the test were to be manually reproduced; or if the test step would be necessary to be known to someone reviewing the results of a failed test in order to better understand the possible nature of the failure.

Upon identifying a test step as loggable, operation 74 associates a textual description with the test step. This textual description should contain sufficient information to permit a person performing a manual test to accurately reproduce the test step which the automated test software is performing. As an example, the textual description could be "Shut down Storage Manager," "Restart Storage Manager," "Launch Disk Manager from File System Manager in main window," "Check Dialog Window for correct message." Each of these textual descriptions may correspond to numerous lines of software in the automated test software for simulating the input to the software product.

Operation 76 executes the test step of the automated testing software. Operation 78 compiles any results of the test step including a test status indicating whether the software product passed or failed the test step, and any error messages associated therewith.

Printing operation 80 prints the test results and the textual descriptions of the test step. As previously discussed, these printed test results and textual descriptions of the test steps can be used for determining the nature of the error, or to manually reproduce the steps performed by an automated test software on a later revision of the software.

Manual reproduction of the operations performed by an automated test program would operate as follows. A user, presumably not a software test designer, can print the log of the textual description of the steps (and sub-processes) actually performed. Using the printed list of steps and sub-processes, the user can reproduce the tests by manually performing each of the steps in the order described.

Figure 7:
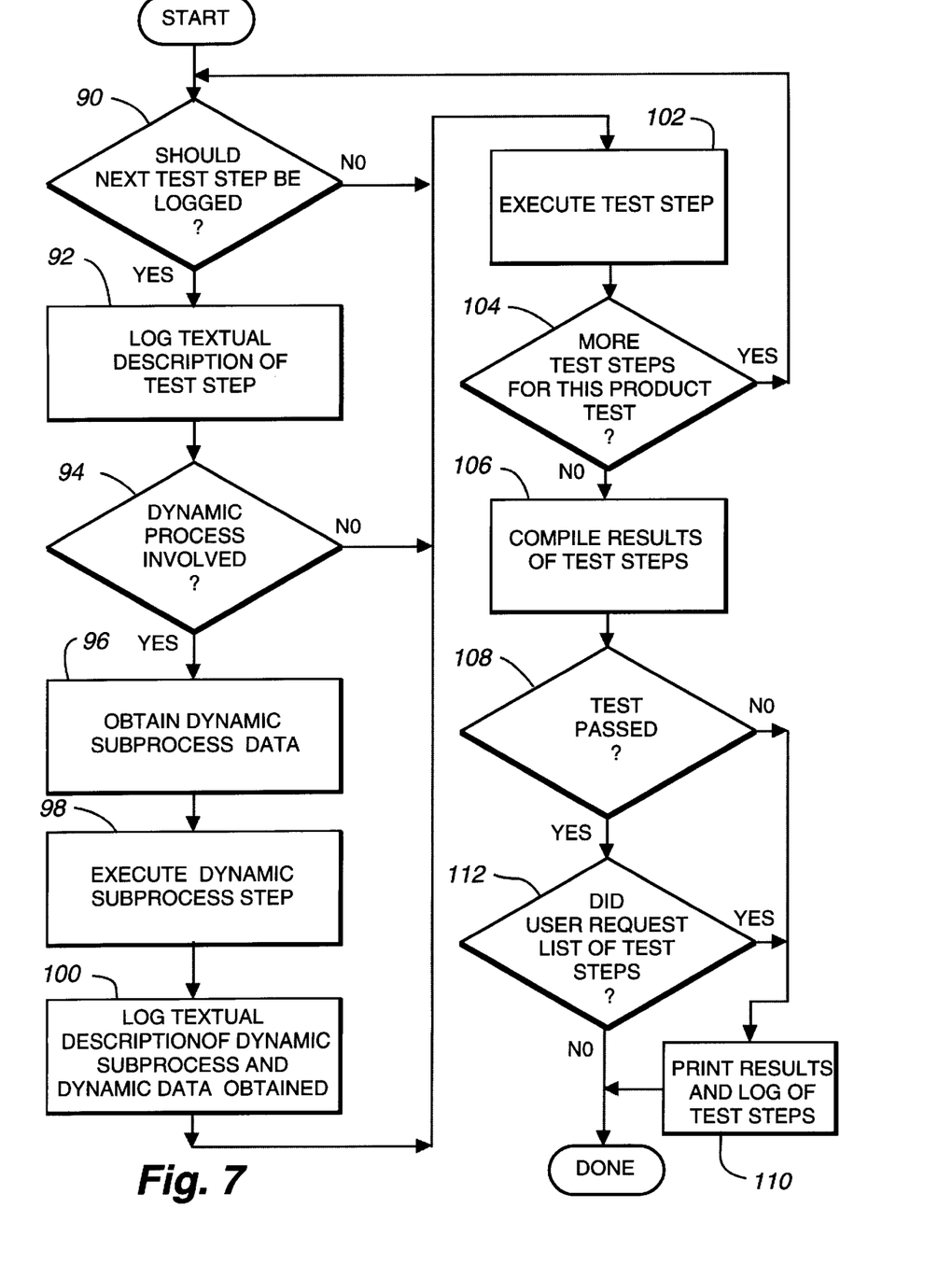
FIG. 7 illustrates another embodiment of the logical operations of the present invention.

FIG. 7 illustrates the logical operations of another embodiment of the present invention for providing textual descriptions of a test step. Operation 90 determines whether the next test step should be logged. As previously described, a test step should be logged if it is necessary to be known by a person manually reproducing the test, or by someone reviewing the results of a test to better understand the nature of the error in the software product. If the next test step should not be logged, then control is passed to operation 102, described below. Otherwise, if the next test step should be logged, then operation 92 logs a textual description of the test step in a log file.

Decision operation 94 determines if a dynamic sub-process is involved in the test step. Generally, a dynamic sub-process would exist where the test software designer would be unable to hard-code the parameters of the test step into the test software, such as where the test step requires a search for information, uses randomness in performing an operation, or where some dynamic data is to be returned from the parent test step. For example, if the parent step contained an operation to "Search for a host having SPARC architecture," the results of this step would not be known until the step is actually performed within the computing system being tested. The dynamic data returned would include the results of this operation, for example, "Found host SPROUTS having SPARC architecture."

If decision operation 94 determines that no dynamic sub-process is involved in the test step, then control is passed to operation 102, described below. Otherwise, if a dynamic sub-process is involved in the test step, operation 96 obtains the dynamic sub-process data required by the test step. This may include searching for a file or examining a value of a variable set by an earlier process. Operation 98 executes the dynamic sub-process step using the data obtained at operation 96 or earlier. Operation 100 logs the textual description of the dynamic sub-process and the dynamic data obtained therefrom to the log file. Control is passed to operation 102.

Operation 102 executes the test step according to the instruction or instructions of the test software which define the test step. Decision operation 104 determines if more test steps exist for this product test. If so, then control is returned to operation 90 to repeat the above-described operations.

If there are no more test steps for this product, then operation 106 compiles the results of the executed test steps. Operation 108 determines if the test passed. This operation determines if the operations performed by the software product resulted in the expected behavior of the product. If the test did not pass, then operation 110 prints the results and the log of the test steps and sub-processes for review by a user. Otherwise, if the test passed, operation 112 determines if a user requested a list of the test steps performed by the automated test software. If so, then operation 112 passes control to operation 110 for printing the log of the test steps and sub-processes performed.

In accordance with the present invention, the results and the log of the test steps can be printed upon the completion of the entire product test, or upon the failure of any single test within the product test. The proper time to print these results is a matter of choice dependent upon the particular implementation chosen.

Figure 8:
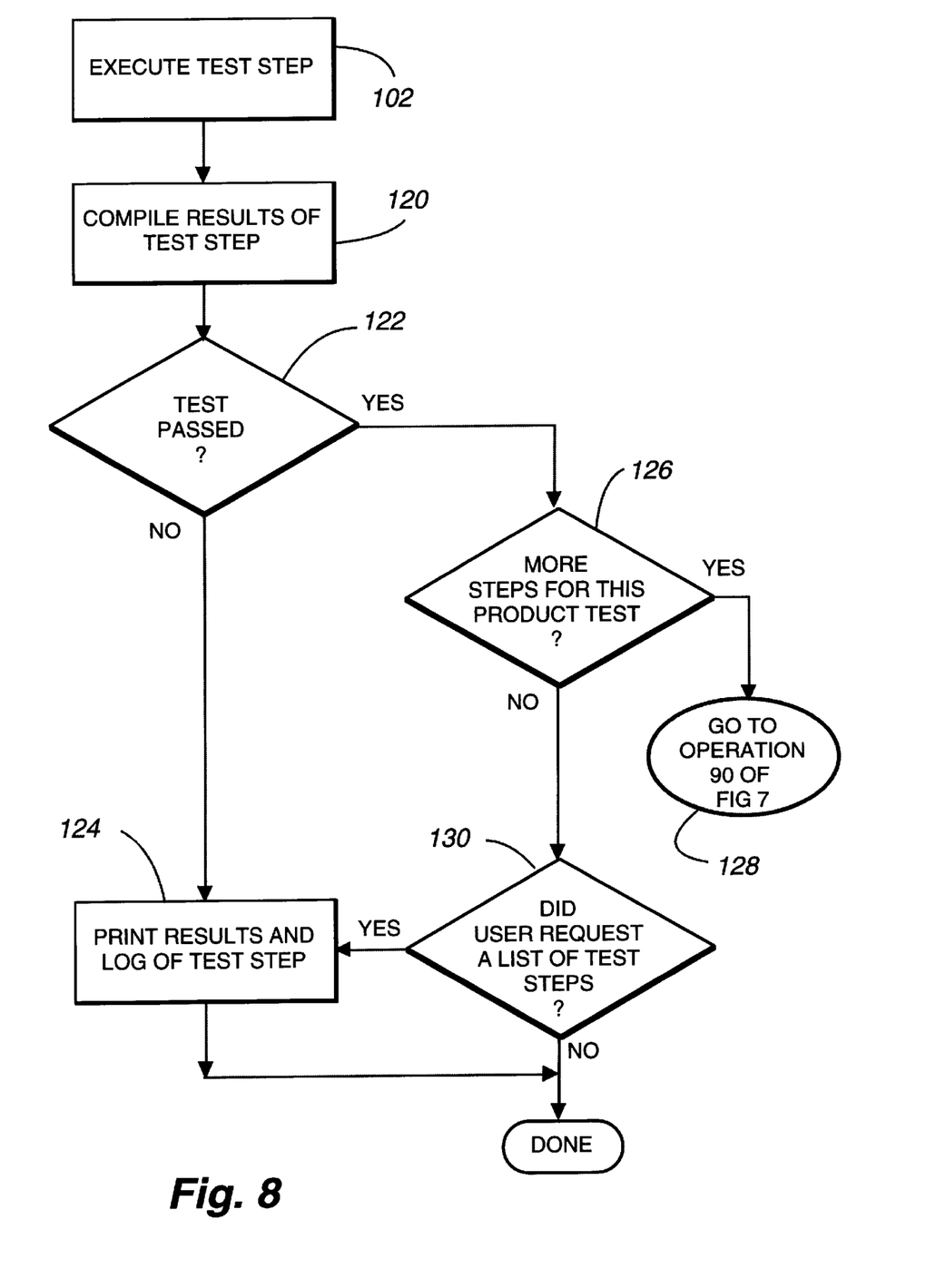
FIG. 8 illustrates another embodiment of the logical operations performed by the present invention after operation 102 in FIG. 7.

FIG. 8 illustrates another embodiment of the present invention wherein the results and log of a test step are printed upon failure of the test. These operations are similar to the operations of FIG. 7 beginning at execution operation 102. After the test step has been executed by operation 102, operation 120 in FIG. 8 compiles the results of the test step. Decision operation 122 then determines if the test passed (i.e., did the test step performed result in the expected behavior). If the test did not pass, then operation 124 prints the results of the test (i.e., the error which occurred) and the log of the test steps executed prior to the error occurring. No further test steps are attempted.

If, however, the test passed at operation 122, then decision operation 126 determines if more test steps exist for this product. If so, then operation 128 returns control to operation 90 of FIG. 7 to repeat the steps previously described. If decision operation 126 determines that there are no more test steps for this product (i.e., the product test successfully passed and the test is completed), then decision operation 130 determines if the user requested a list of these test steps, and if so, operation 124 prints the results of the test and the log of the test steps.

FIG. 9 illustrates a sample output of the logging module of the present invention. The sample output 140 comprises a sample error message 142 (corresponding to test results 30 in FIG. 1) and a sample list of test steps 144 performed (corresponding to the list of test steps 28 in FIG. 1).

As the example output 140 of FIG. 9 illustrates, the product software failed in that the "Expected dialog window did not appear after attempting disk layout copy." This error message alone may be insufficient to describe the possible scenarios which led to the error.

As shown in FIG. 9, the sample list 144 includes a list of the test steps 146 performed and the dynamic sub-process steps and dynamic data 148 associated with the test steps. The test steps are presented in a different format than the format of the sub-process steps and dynamic data.

The example test process shown includes 13 steps which occurred prior to the generation of the error message 142. The first step "Search for two identical disks," is shown to involve five dynamic sub-processes, labeled A, B, C, D, and E. The data obtained from each of the dynamic sub-processes is also listed as being associated with each sub-process.

The next step in the test shown in FIG. 9 uses a format command to create a "Random Slice Layout" on one of the disks found by the first test step. The sub-processes involved and the dynamic data associated therewith are listed as a to h. The remaining portions of the step list 144 are similar in nature.

It will therefore be appreciated that a person wishing to manually reproduce the automated test performed could, by utilizing the output of the logging module of the present invention, manually perform each of these test steps to better understand the nature of the resulting error. Further, the printed output could also be forwarded as a "bug report" to the persons responsible for the development of the software for their analysis and review of the possible source of the failure. Finally, as described above, if the automated test had passed, then the output of the logging module could be used at a later date for a software product which is a minor or slight revision of the product which already passed. A manual tester could quickly verify the proper operations of the revised software by manually performing the steps listed.

While the invention has been particularly shown and described with reference to a preferred embodiment thereof, it will be understood by those skilled in the art that various other changes in the form and details may be made without departing from the spirit and scope of the invention.

What is claimed is:

1. A method of converting a successful automated test of a first software product to a manual test of a second software product, where the second software product is a revision of the first software product, the method comprising the steps of:

automatically testing the first software product by a test software module which exercises said first software product and determines a test status of said first software product, said test software module having one or more test steps;

storing in a storage area a textual description of simulated manual user input functions performed by automatic test steps executed by said test software module on the first software product;

determining that said test status indicates that the first software product successfully passed said automatic test;

in response to said determining step, writing said textual description to a tangible medium; and manually testing said second software product by manually performing the user input functions described in the textual description written to said tangible medium.

2. A system for automatically testing a software product and for providing a human-readable textual description of test steps that were performed by test software prior to an error being detected, so that a person not intimately familiar with the test software can manually reproduce the described test steps as a point of error of the software product is manually verified, the system comprising:

a test software module for automatically exercising said software product and for determining an error status of said software product;

said test software module providing a plurality of test steps for simulating user input functions to said software product;

a storage area for storing a human-readable textual description of simulated user input functions performed by a set of test steps and automatically executed by said test software module prior to an error status being detected of said software product;

said set of test steps including at least one test step that includes one or more sub-process steps producing dynamic data that is unknown until said one or more sub-process steps are executed by said software product;

a process logging module, responsive to said test software module, for providing a human-readable textual description to said storage area in a first readable format relative to said set of test steps, exclusive of said at least one test step that includes one or more sub-process steps;

a sub-process logging module, responsive to said test software module, for providing a human-readable textual description to said storage area in a second readable format relative to said at least one test step and said one or more sub-process steps and said dynamic data produced by said one or more sub-process steps; and an output module, responsive to said storage area, for writing to a tangible medium said human-readable textual descriptions provided to said storage area;

said tangible medium for use by a person not intimately familiar with said test software in manually reproducing said set of test steps as a point of error of said software product is manually verified.

3. The system of claim 2 wherein said process logging module and said test software module are integral.

4. The system of claim 2 wherein said output module additionally writes to said tangible medium a human-readable error message describing said error status.

5. A computer program product for use in automatically testing a software product and for providing a human-readable textual description of test steps that were initiated by computer-readable code devices prior to a software error being detected so that a person not intimately familiar with the test software can manually reproduce the described test steps as a point of error of the software product is manually verified, comprising:

a computer-usable code storage medium;

computer-readable code devices embodied in said storage medium for automatically testing said software product, the computer-readable code devices comprising:

computer-readable code devices for automatically exercising said software product and for determining an error status of said software product, said computer-readable code devices providing a plurality of test steps for simulating user input functions to said software product;

computer-readable code devices for providing a storage area for storing a human-readable textual description of simulated user input functions performed by a set of test steps and executed by said test software module prior to an error status being determined of said software product;

said set of test steps including at least one test step that includes one or more sub-process steps that produce dynamic data that is unknown until said one or more sub-process steps are executed by said software product;

computer-readable code devices for providing a process logging module that is responsive to said test software module, and that provides a human-readable textual description to said storage area in a first readable format relative to said set of test steps, exclusive of said at least one test step that includes one or more sub-process steps;

computer-readable code devices for providing a sub-process logging module that is responsive to said test software module, and providing a human-readable textual description to said storage area in a second readable format relative to said at least one test step, and said one or more sub-process steps and said dynamic data produced by said one or more sub-process steps; and computer-readable code devices for providing an output module responsive to said storage area and that writes to a tangible medium said human-readable textual descriptions provided to said storage area;

said tangible medium for use by a person not intimately familiar with said test software in manually reproducing said set of test steps as a point of error status of said software product is manually verified.

6. The computer program product of claim 5 wherein said process logging module and said test software module are integral.

7. The computer program product of claim 5 wherein said output module additionally writes to said tangible medium a human-readable error message describing said detected error status.

8. A method for automatically testing a software product and for providing a human-readable textual description of test steps performed by the software product prior to an error being detected in performance of the software product, so that a human user not intimately familiar with the method of testing can manually reproduce on the software product the described test steps, so that a point of error in performance of the software product can be manually verified by the user, comprising:

creating a set of test steps to be automatically performed on the software product;

said set of test steps having one or more test steps that included one or more sub-process test steps, said one or more sub-process test steps each having dynamic data associated therewith which is unknown until said one or more sub-process test steps have been automatically performed on the software product;

identifying a loggable test step from said set of test steps;

said loggable test step being defined as a test step that must to be known in order for a test step resulting if an error product were to be manually reproduced on the software product by the user, so that the nature of the loggable test can be understood by the user;

associating a human-readable textual description of a simulated user input function with said identified loggable test step;

determining if said identified loggable test step includes one or more sub-process test steps;

when said identified loggable test step does not include one or more sub-process test steps, automatically performing said identified loggable test step on the software product, detecting a failure of the software product to perform said identified loggable test step, and upon said failure being detected, writing to a tangible medium a user-readable textual description corresponding to at least said identified loggable test step; and when said identified loggable test step includes one or more sub-process test steps, automatically performing said identified loggable test step including said one or more sub-process test steps on the software product, detecting a failure of the software product to perform said identified loggable test step including said one or more sub-process test steps, and upon said failure being detected, writing to a tangible medium a user-readable textual description corresponding to said identified loggable test step, said one or more sub-process test steps, and dynamic data associated therewith.

9. The method of claim 8 including the steps of:

producing a human-readable error message describing said detected failure; and writing said error message to a said tangible medium.

10. The method of claim 8 including the steps of:

writing said user-readable textual description corresponding to at least said identified loggable test step to said tangible medium in a first user distinguishable format; and writing said user-readable textual description corresponding to said identified loggable test step, said one or more sub-process test steps and said dynamic data associated therewith to said tangible medium in a second user distinguishable format.

* * * * *